(12) United States Patent
Wang et al.

(10) Patent No.: US 11,995,560 B2
(45) Date of Patent: May 28, 2024

(54) METHOD AND APPARATUS FOR GENERATING VECTOR REPRESENTATION OF KNOWLEDGE GRAPH

(71) Applicant: BEIJING BAIDU NETCOM SCIENCE AND TECHNOLOGY CO., LTD., Beijing (CN)

(72) Inventors: Quan Wang, Beijing (CN); Pingping Huang, Beijing (CN); Haifeng Wang, Beijing (CN); Wenbin Jiang, Beijing (CN); Yajuan Lyu, Beijing (CN); Yong Zhu, Beijing (CN); Hua Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 912 days.

(21) Appl. No.: 17/043,227

(22) PCT Filed: Apr. 7, 2020

(86) PCT No.: PCT/CN2020/083547
§ 371 (c)(1),
(2) Date: Sep. 29, 2020

(87) PCT Pub. No.: WO2021/068468
PCT Pub. Date: Apr. 15, 2021

(65) Prior Publication Data
US 2023/0103430 A1    Apr. 6, 2023

(30) Foreign Application Priority Data

Oct. 8, 2019   (CN) .......................... 201910950874.6

(51) Int. Cl.
*G06N 5/02* (2023.01)
*G06F 16/31* (2019.01)
(Continued)

(52) U.S. Cl.
CPC ............... *G06N 5/02* (2013.01); *G06N 5/022* (2013.01); *G06F 16/31* (2019.01); *G06F 16/316* (2019.01);
(Continued)

(58) Field of Classification Search
CPC .......... G06N 5/02; G06N 5/022; G06N 3/042; G06N 3/045; G06N 3/08; G06F 16/316;
(Continued)

(56) References Cited

U.S. PATENT DOCUMENTS 11,481,603 B1* 10/2022 Newman ................ G06N 3/042
2018/0101742 A1    4/2018 Burge et al.
(Continued)

FOREIGN PATENT DOCUMENTS

| CN | 106339401 A | 1/2017 |
| CN | 108052625 A | 5/2018 |

(Continued)

OTHER PUBLICATIONS

Search Report for European Application No. 20767703.0, dated Jun. 16, 2023, 8 pages.
(Continued)

*Primary Examiner* — Quoc A Tran
(74) *Attorney, Agent, or Firm* — Lippes Mathias LLP (57) ABSTRACT

The present disclosure discloses a method and an apparatus for generating a vector representation of a knowledge graph, and relates to a field of a field of artificial intelligence technologies. The detailed implementing solution is: obtaining a knowledge graph, the knowledge graph including a plurality of entity nodes; obtaining a context type and context data corresponding to the knowledge graph; and generating vector representations corresponding to the plurality of entity nodes by a context model based on the context data and the context type.

15 Claims, 5 Drawing Sheets obtaining a knowledge graph, the knowledge graph including a plurality of entity nodes — 101 obtaining a context type and context data corresponding to the knowledge graph — 102 generating vector representations corresponding to the plurality of entity nodes by a context model based on the context data and the context type — 103

(51) Int. Cl.
  *G06F 16/33*   (2019.01)
  *G06F 16/35*   (2019.01)
  *G06F 16/36*   (2019.01)
  *G06F 16/901*  (2019.01)
  *G06F 16/906*  (2019.01)
  *G06F 40/279*  (2020.01)
  *G06N 3/042*   (2023.01)
  *G06N 3/045*   (2023.01)
  *G06N 3/08*    (2023.01)
  *G06N 5/022*   (2023.01)

(52) U.S. Cl.
  CPC .......... *G06F 16/3347* (2019.01); *G06F 16/35* (2019.01); *G06F 16/36* (2019.01); *G06F 16/367* (2019.01); *G06F 16/9017* (2019.01); *G06F 16/9024* (2019.01); *G06F 16/906* (2019.01); *G06F 40/279* (2020.01); *G06N 3/042* (2023.01); *G06N 3/045* (2023.01); *G06N 3/08* (2013.01)

(58) Field of Classification Search
  CPC .... G06F 16/35; G06F 16/9017; G06F 16/906; G06F 16/9024; G06F 40/279; G06F 16/367; G06F 16/31; G06F 16/36; G06F 16/3347
  See application file for complete search history.

(56) References Cited

U.S. PATENT DOCUMENTS

| | | | |
|---|---|---|---|
| 2018/0196873 A1 | 7/2018 | Yerebakan et al. | |
| 2018/0232443 A1* | 8/2018 | Delgo | G06F 16/35 |
| 2018/0341863 A1 | 11/2018 | Ding et al. | |
| 2021/0142008 A1* | 5/2021 | Patra | G06F 40/237 |

FOREIGN PATENT DOCUMENTS

| | | |
|---|---|---|
| CN | 108959328 A | 12/2018 |
| CN | 109165278 A | 1/2019 |
| CN | 109189882 A | 1/2019 |
| CN | 109271516 A | 1/2019 |
| CN | 109739995 A | 5/2019 |
| CN | 109902145 A | 6/2019 |
| CN | 110147414 A | 8/2019 |
| CN | 110795569 A | 2/2020 |
| JP | 2019125364 A | 7/2019 |
| JP | 6567218 B1 | 8/2019 |
| WO | 2012176317 A1 | 12/2012 |
| WO | 2019003069 A1 | 1/2019 |
| WO | 2019178155 A1 | 9/2019 |

OTHER PUBLICATIONS

Sun, Haitian et al.; "PullNet: Open Domain Question Answering with Iterative Retrieval on Knowledge Bases and Text"; Apr. 21, 2019.
Office Action for Japanese Application No. 2021-515601, dated May 10, 2022, 3 pages.
International Search Report for PCT Application No. PCT/CN2020/083547, dated Jun. 30, 2020, 10 pages.
Liang Chang et al., "Knowledge Graph Embedding by Dynamic Translation", IEEE Access, vol. 5, 2017, 10 pages.
Office Action for Chinese Application No. 201910950874.6, dated Jan. 18, 2021, 17 pages.
Xiaojun Kang et al., "TDN: An Integrated Representation Learning Model of Knowledge Graphs", IEEE Access, Published on Apr. 24, 2019, 7 pages.
Liu Kang et al., "Representation Learning for Question Answering over Knowledge Base: An Overview", ACTA Automatica Sinica, vol. 42, No. 6, dated Jun. 2016, 12 pages. (Abstract in English).

* cited by examiner

METHOD AND APPARATUS FOR GENERATING VECTOR REPRESENTATION OF KNOWLEDGE GRAPH

CROSS-REFERENCE TO RELATED APPLICATION(S)

This application is a U.S. national phase of International Application No. PCT/CN20191072337, which claims a priority to Chinese Patent Application No. 201910950874.6, filed Oct. 8, 2019, the entire contents of which are incorporated herein by reference.

FIELD

The present disclosure relates to a field of computer technologies and more particularly to a field of artificial intelligence technologies, and provides a method and an apparatus for generating a vector representation of a knowledge graph, and a device.

BACKGROUND

A knowledge graph is a knowledge base describing a directed graph structure of world real knowledge. An intention of representation learning for the knowledge graph is to represent entities/relationships of discrete symbols in the knowledge graph as vectors. On the one hand, a vector representation may retain key information about structure of an entity in the knowledge graph, on the other hand, it is convenient for an application task to utilize the knowledge graph. Presently, in tasks such as information extraction, question and answer, and reading comprehension, the knowledge graph is applied and plays a role in a vector form.

SUMMARY

Embodiments of the present disclosure provides a method for generating a vector representation of a knowledge graph. The method includes: obtaining a knowledge graph, the knowledge graph including a plurality of entity nodes; obtaining a context type and context data corresponding to the knowledge graph; and generating vector representations corresponding to the plurality of entity nodes by a context model based on the context data and the context type.

Embodiments of the present disclosure provides an apparatus for generating a vector representation of a knowledge graph. The apparatus includes at least one processor and a memory. The memory is communicatively coupled to the at least one processor. The memory is configured to store instructions executable by the at least one processor. When the instructions are executed by the at least one processor, the at least one processor is caused to execute the method for generating the vector representation of the knowledge graph according to the first aspect of embodiments.

Embodiments of the present disclosure provides a non-transitory computer readable storage medium having computer instructions stored thereon. The computer instructions are configured to cause a computer to execute the method for generating the vector representation of the knowledge graph according to the first aspect of embodiments.

Other effects of the above alternative embodiments will be described below with reference to detailed embodiments.

BRIEF DESCRIPTION OF THE DRAWINGS

The accompanying drawings are used for better understanding the solution and do not constitute a limitation of the present disclosure.

DETAILED DESCRIPTION

Description to exemplary embodiments of the present disclosure will be made below with reference to accompanying drawings, which includes various details of embodiments of the present disclosure to facilitate understanding, and should be regarded as merely exemplary.

Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

Figure 1:
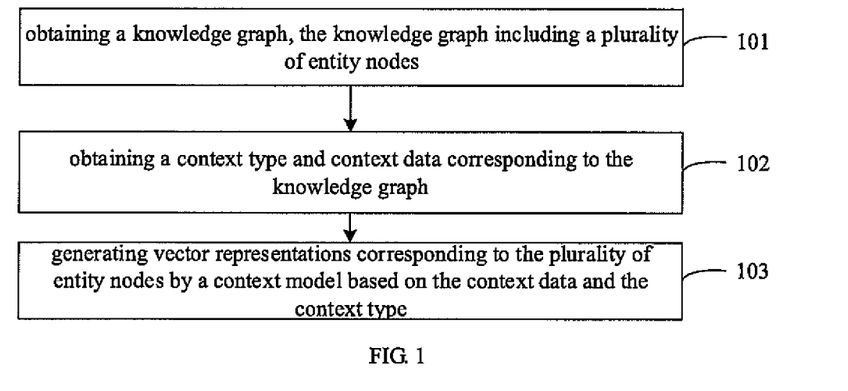
FIG. 1 is a flow chart illustrating a method for generating a vector representation of a knowledge graph according to an embodiment of the present disclosure.

FIG. 1 is a flow chart illustrating a method for generating a vector representation of a knowledge graph according to an embodiment of the present disclosure. As illustrated in FIG. 1, the method includes following.

At block 101, a knowledge graph is obtained. The knowledge graph includes a plurality of entity nodes.

In an actual application, when representation learning for the knowledge graph is performed, there is a need to obtain a vector representation of the knowledge graph. For example, entities/relationships of discrete symbols in the knowledge graph are represented as a continuous vector. In this embodiment, when the vector representation of the knowledge graph is generated, the knowledge graph may be obtained first.

Alternatively, the knowledge graph includes the plurality of entity nodes and edges between the entity nodes. For example, the knowledge graph includes entity nodes "character A" and "occupation B", and an edge connecting the two entity nodes, which represents that there is a relationship "holding a position of" between the two entity nodes.

At block 102, a context type and context data corresponding to the knowledge graph are obtained.

In this embodiment, the context type corresponding to the knowledge graph may be obtained, and then the context data of the knowledge graph may be determined based on the context type. The context type includes a sequence structure context type and a sub-graph context type.

Obtaining the context type corresponding to the knowledge graph may be described below.

For example, the number of the plurality of entity nodes in the knowledge graph is obtained. It is determined that the context type corresponding to the knowledge graph is the sequence structure context type in a case that the knowledge graph includes two entity nodes. It is determined that the context type corresponding to the knowledge graph is the sub-graph context type in a case that the knowledge graph includes more than two entity nodes.

In this embodiment, after the context type corresponding to the knowledge graph is determined, a corresponding way is selected to determine the context data of the knowledge graph based on different context types.

For example, for a knowledge graph of the sequence structure context type, the entity nodes and the edges between the entity nodes in the knowledge graph may be added to the context data.

For another example, for a knowledge graph of the sub-graph context type, a target entity node in the knowledge graph may be determined, and entity nodes and edges in a preset range centered on the target entity node in the knowledge graph may be added to the context data.

At block 103, vector representations corresponding to the plurality of entity nodes are generated by a context model based on the context data and the context type.

In this embodiment, the context model corresponding to the context type may be trained in advance. An input of the context model is the context data, and an output is the vector representation. Thus, by inputting the context data into the context model, the vector representations corresponding to the plurality of entity nodes in the knowledge graph may be generated.

For example, a sequence structure context model is called to generate the vector representations corresponding to the plurality of entity nodes based on the context data in a case that the context type is the sequence structure context type. A sub-graph context model is called to generate the vector representations corresponding to the plurality of entity nodes based on the context data in a case that the context type is the sub-graph context type.

It should be understood that, in the related art, graph elements (including the entity nodes and the edges) is learnt to statistic and fixed vector representations. For example, for one entity, the corresponding vector representation is unchanged, while the context of the graph element is ignored. The context of a graph element refers to a connected structure consisted of the graph element and other graph elements. In this embodiment, by obtaining the context type and the context data corresponding to the knowledge graph, the vector representation corresponding to the plurality of entity nodes are generated by the context model based on the context data and the context types. In this way, for one entity, the obtained representation vectors are different as the context where the entity is located varies. For example, for an entity character A in the knowledge graph, the vector representations generated in different contexts are different. In this way, when the vector representations corresponding to the plurality of entity nodes in the knowledge graph are generated, the contexts where the entities are located are considered, which improves a modeling ability of the vector representations for a complex relationship (such as, one-to-more, and more-to-more) and makes a representation ability more sufficient.

With the method for generating the vector representation of the knowledge graph according to embodiments of the present disclosure, by obtaining the knowledge graph, the context type and the context data corresponding to the knowledge graph are obtained. Further, the vector representations corresponding to the plurality of entity nodes are generated by the context model based on the context data and the context type. In this way, the context where the entity is located is considered when the vector representation of the entity is generated. When the context where the entity is located varies, the vector representations obtained of the entity are different, which improves a modeling ability of the vector representation for a complex relationship, makes the representing ability more sufficient, and realizes a refined semantic representation of the entity in the context, thereby further improving the accuracy of representation learning for the knowledge graph.

Based on the above embodiments, the sequence structure context type may be described as an example.

Figure 2:
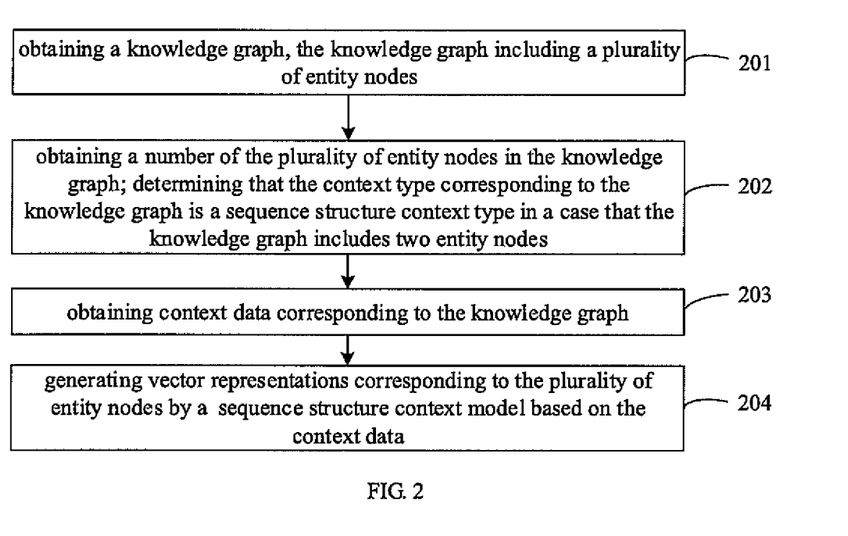
FIG. 2 is a flow chart illustrating a method for generating a vector representation of a knowledge graph according to another embodiment of the present disclosure.

FIG. 2 is a schematic diagram illustrating a method for generating a vector representation of a knowledge graph according to another embodiment of the present disclosure. As illustrated in FIG. 2, the method includes following.

At block 201, a knowledge graph is obtained. The knowledge graph includes a plurality of entity nodes.

At block 202, the number of the plurality of entity nodes in the knowledge graph is obtained. It is determined that a context type corresponding to the knowledge graph is a sequence structure context type in a case that the knowledge graph includes two entity nodes.

In this embodiment, the knowledge graph includes the two entity nodes, that is, after determining that the context type is the sequence structure context type, the number of edges between the two entity nodes may be further determined. Alternatively, the number of edges between the two entity nodes is obtained. It is determined that the context type corresponding to the knowledge graph is an edge structure context type in a case that the number of edges between the two entity nodes is equal to 1. It is determined that the context type corresponding to the knowledge graph is a path structure context type in a case that the number of edges between the two entity nodes is greater than 1.

Figure 3:
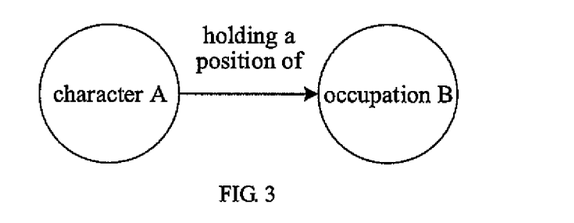
FIG. 3 is a schematic diagram illustrating a knowledge graph according to an embodiment of the present disclosure.

For example, referring to FIG. 3, the knowledge graph includes entity nodes "character A" and "occupation B", and an edge "hold a position of" connecting the two entity nodes, thus the context type is determined to be the edge structure context type.

Figure 4:
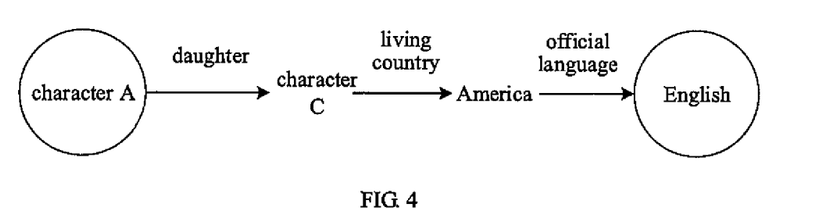
FIG. 4 is a schematic diagram illustrating a knowledge graph according to another embodiment of the present disclosure.

For another example, referring to FIG. 4, the knowledge graph includes entity nodes "character A" and "English", and edges "daughter", "living country" and "official language" connecting the two entity nodes in turn, thus the context type is determined to be the path structure context type.

At block 203, the context data corresponding to the knowledge graph is obtained.

In this embodiment, the context type of the knowledge graph include the edge structure context type and the path structure context type, and the context data corresponding to knowledge graph is obtained based on the context type of the knowledge graph.

For example, when the context type is the edge structure context type, all triplets corresponding to the knowledge graph are added to the context data. For example, the knowledge graph illustrated in FIG. 3 adds corresponding triplets (character A, hold a position of, occupation B) to the context data.

For another example, when the context type is the path structure context type, a path corresponding to the knowledge graph is obtained, path data of the path is obtained by path sampling, and the path data and the entity nodes in the knowledge graph are added to the context data. For example, in the knowledge graph illustrated in FIG. 4, the path data "daughter", "living country", "official language" and entity nodes "character A" and "English" are added to the context data. Alternatively, a corresponding amount of path data may be obtained by random walking sampling based on the edges in the knowledge graph.

At block 204, the vector representations corresponding to the plurality of entity nodes are generated by the sequence structure context model based on the context data.

In this embodiment, the context type corresponding to the knowledge graph is the sequence structure context type. After the context data of the knowledge graph is obtained, the context data is input into a pre-trained sequence structure context model for processing, and the vector representations corresponding to the plurality of entity nodes are generated.

With the method for generating the vector representation of the knowledge graph according to embodiments of the present disclosure, corresponding context data may be obtained for the knowledge graph of the sequence structure context type, thereby generating the vector representations corresponding to the plurality of entity nodes in the knowledge graph based on the context data. When the vector representations of the plurality of entity nodes in the knowledge graph are generated, the contexts where the entities are located are considered, and the representation ability is more sufficient.

Based on the above embodiments, the sub-graph context type may be described as an example below.

Figure 5:
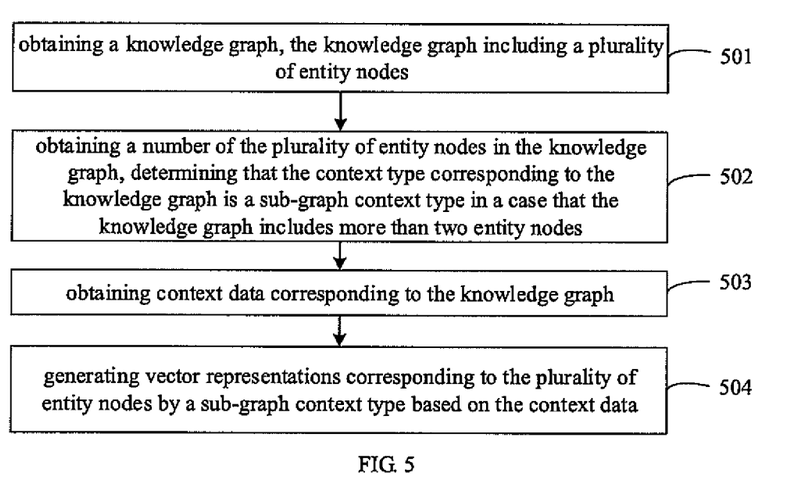
FIG. 5 is a flow chart illustrating a method for generating a vector representation of a knowledge graph according to another embodiment of the present disclosure.

FIG. 5 is a flow chart illustrating a method for generating a vector representation of a knowledge graph according to another embodiment of the present disclosure. As illustrated in FIG. 5, the method includes following.

At block 501, a knowledge graph is obtained. The knowledge graph includes a plurality of entity nodes.

At block 502, the number of the plurality of entity nodes in the knowledge graph is obtained. It is determined that the context type corresponding to the knowledge graph is a sub-graph context type in a case that the knowledge graph includes more than two entity nodes.

Figure 6:
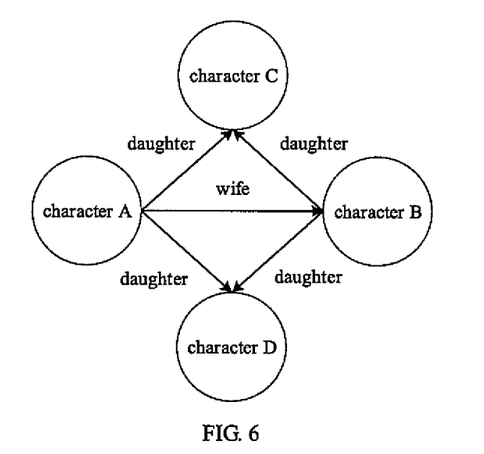
FIG. 6 is a schematic diagram illustrating a knowledge graph according to another embodiment of the present disclosure.

For example, referring to FIG. 6, the knowledge graph includes entity nodes "character A", "character B", "character C" and "character D", and edges "daughter" and "wife", thus the context type is determined as the sub-graph context type.

At block 503, context data corresponding to the knowledge graph is obtained.

In this embodiment, the context data is obtained in a following way.

At action S1, an entity node collection corresponding to the knowledge graph is generated. At action S2, a first initial entity node is extracted from the entity node collection, and a walking radius d is generated. At action S3, the first initial entity node is taken as a center, walking is performed on the knowledge graph with the walking radius d, to determine a d-order sub-graph centered on the first initial entity node, and the d-order sub-graph centered on the first initial entity node is added to the context data. At action S4, the actions S2 and S3 are repeatedly executed until extraction for the entity nodes in the entity node collection is finished.

Alternatively, the walking radius d may be generated by randomly sampling from a preset range (such as, 1-Dmax). After the d-order sub-graph centered on the first initial entity node is determined, edges in the sub-graph may also be complemented.

At block 504, vector representations corresponding to the plurality of entity nodes are generated by a sub-graph context model based on the context data.

In this embodiment, the context type corresponding to the knowledge graph is the sub-graph context type. After the context data of the knowledge graph is obtained, the context data is inputted into a pre-trained sub-graph context model for processing, and the vector representations corresponding to the plurality of entity nodes are generated.

With the method for generating the vector representation of the knowledge graph according to embodiments of the present disclosure, the corresponding context data may be obtained for the knowledge graph of the sub-graph context type, and then the vector representations of the plurality of entity nodes in the knowledge graph are generated based on the context data. When the vector representations of the plurality of entity nodes in the knowledge graph are generated, the contexts in which entities are located are considered, and the representation ability is more sufficient.

Based on the above embodiments, training the sequence structure context model may be described below.

Figure 7:
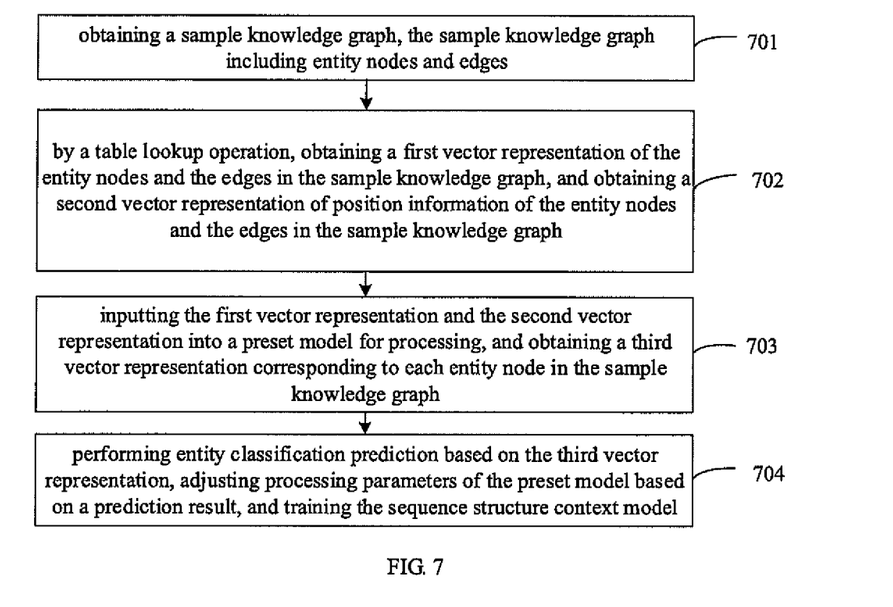
FIG. 7 is a flow chart of training a sequence structure context model according to an embodiment of the present disclosure.

FIG. 7 is a flow chart of training a sequence structure context model according to an embodiment of the present disclosure. As illustrated in FIG. 7, FIG. 7 includes following.

At block 701, a knowledge graph is obtained. The knowledge graph includes a plurality of entity nodes.

In this embodiment, when the sequence structure context model is trained, the sample knowledge graph may be obtained. The sample knowledge graph includes entity nodes and edges. For example, a knowledge graph whose context type is the sequence structure context type may be obtained as the sample knowledge graph.

At block 702, by a table lookup operation, first vector representations of the entity nodes and the edges in the sample knowledge graph is obtained, and second vector representations of position information of the entity nodes and the edges in the sample knowledge graph is obtained.

In this embodiment, the vector representations of the entity nodes and the vector representations of the edges are obtained as the first vector representations by the table look-up operation. The vector representations corresponding to the position information of the entity nodes in a sequence and the vector representations corresponding to the position information of the edges in the sequence are obtained as the second vector representations by the table lookup operation.

At block 703, the first vector representations and the second vector representations are inputted into a preset model for processing, and a third vector representation corresponding to each entity node in the sample knowledge graph is obtained In this embodiment, both the entity nodes and the edges are taken as the input of the preset model. For example, the first vector representations and the second vector representations corresponding to the entity nodes/edges are added as the input of the preset model.

That is, $h_i^0 = x_i^{ele} + x_i^{pos}$, where, $x_i^{ele}$ represents a vector representation corresponding to an entity node/edge obtained by the table look-up operation, a value of the table may be updated continuously during model training. $x_i^{pos}$ represents a vector representation corresponding to position information of an entity node/edge in the sequence obtained by the table look-up operation. $h_i^0$ represents an $i^{th}$ input.

In an embodiment of the present disclosure, the preset model is a self-attention model (a transformer model). The $h_i^0$ is inputted to the preset model, and processed by a L-layer transformer model. The third vector representation is determined based on a vector representation outputted by the $L^{th}$ layer transformer model, that is, the third vector representation of each entity node in the context may be represented by $h_i^l$, which is denoted by $$h_i^l = \text{Transformer}(h_i^{l-1}), l=1,2,\ldots,L.$$

It should be noted that, a detailed implementation for calculating and obtaining the vector representation based on the transformer model may be implemented based on the related art, which may not be elaborated here.

At block 704, entity classification prediction is performed based on the third vector representation, processing parameters of the preset model are adjusted based on a prediction result, and the sequence structure context model is trained.

In this embodiment, after the third vector representation of each entity node is obtained, the third vector representation is processed based on a forward neural network (FFNN) and a softmax function to obtain a probability distribution $P(o) = \text{softmax}(\text{FFNN}(h_i^L))$ of each prediction result.

Thus the processing parameters of the preset model are optimized by maximizing a probability value of an actual result corresponding to the entity node.

For example, the entity node is "English", and the respective obtained prediction results include English, French, Japanese, etc. By adjusting the processing parameters of the preset model, a probability of "English" in the prediction results is maximized, thereby the sequence structure context model is trained.

Figure 8:
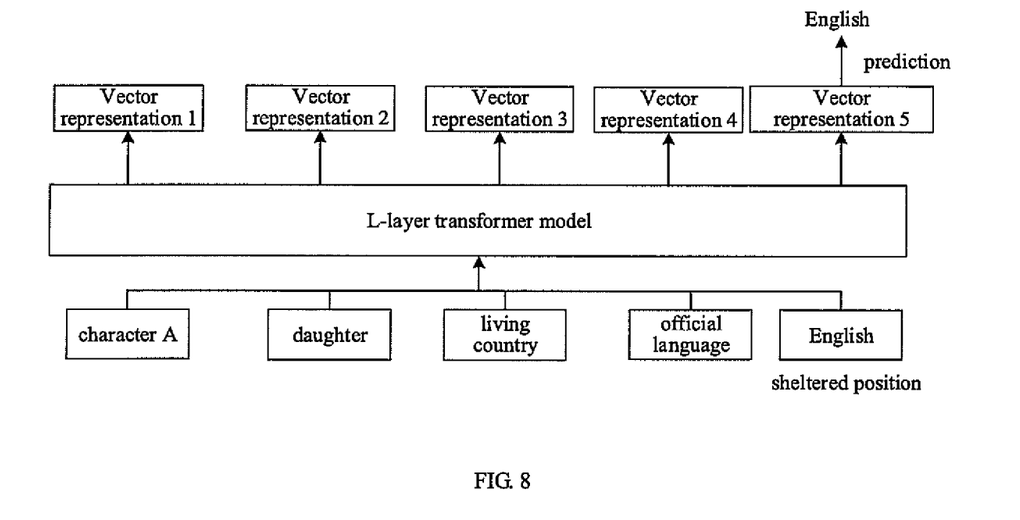
FIG. 8 is a schematic diagram illustrating a sequence structure context model.

For example, referring to FIG. 8, the knowledge graph illustrated in FIG. 4 is taken as an example. The entity nodes "character A" and "English" and the edges "daughter", "living country" and "official language" are taken as the input of the preset model, and a sheltered position is determined as a position of the entity node "English". The third vector representation outputted by the sheltered position is obtained after processing of the L-layer transformer model. A probability distribution of each prediction result is obtained based on the third vector representation. By maximizing the probability value of the actual result corresponding to the entity node, the processing parameters of the preset model are optimized. Further, the sheltered position is set as a position where the entity node "character A" is located for training.

In this way, by occluding an entity node in the context, predicting the occluded entity node by the preset model, and comparing the prediction result with the actual result, the processing parameters of the preset model are adjusted based on a compared result until the prediction result is consistent with the actual result, thereby implementing to train the sequence structure context model.

In this embodiment of the present disclosure, the sequence structure context model may be trained, such that the input of the sequence structure context model is the context data, and the output is the vector representation corresponding to an entity node.

Based on the above embodiments, training the sub-graph context model will be described below.

Figure 9:
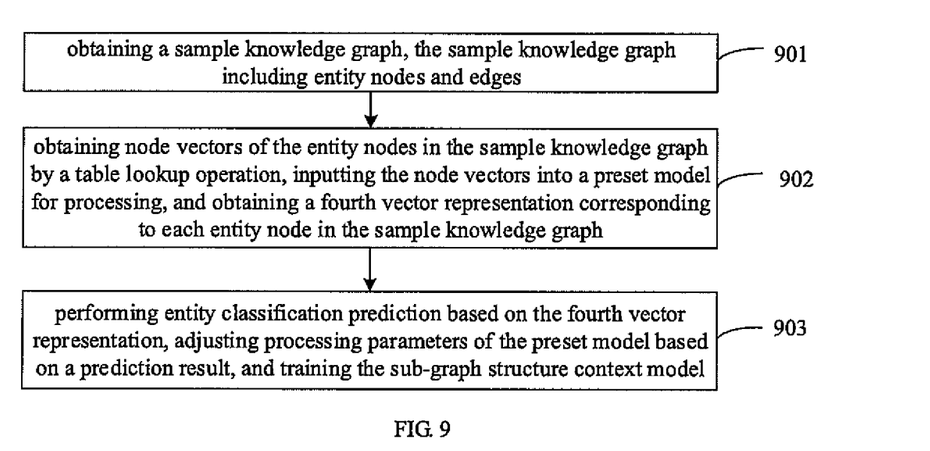
FIG. 9 is a flow chart of training a sub-graph context model according to an embodiment of the present disclosure.

FIG. 9 is a flow chart illustrating training a sub-graph context model according to an embodiment of the present disclosure. As illustrated in FIG. 9, FIG. 9 includes following.

At block 901, a sample knowledge graph is obtained. The sample knowledge graph includes entity nodes and edges.

In this embodiment, when the sub-graph context model is trained, the sample knowledge graph may be obtained. The sample knowledge graph includes the entity nodes and the edges. For example, a knowledge graph whose context type is a sub-graph context type may be obtained as the sample knowledge graph.

At block 902, node vectors of the entity nodes in the sample knowledge graph are obtained by a table lookup operation, the node vectors are inputted into a preset model for processing, and a fourth vector representation corresponding to each entity node in the sample knowledge graph is obtained.

In this embodiment, the entity nodes are taken as the input of the preset model, that is, the node vectors of the entity nodes in the sample knowledge graph are obtained by the table lookup operation, and the node vectors are input into the preset model for processing to obtain the fourth vector representation corresponding to each entity node in the sample knowledge graph.

That is, $h_i^0 = x_i^{ele}$, where, $x_i^{ele}$ represents a node vector, and $h_i^0$ represents the $i^{th}$ input. It should be noted that, the description for obtaining the first vector representation in the above embodiment is also applicable to obtaining the node vector in this embodiment, which is not elaborated here.

In an embodiment of the present disclosure, the preset model may be a self-attention model (a transformer model), and all the node vectors are inputted into the preset model. After the node vectors are processed by a L-layer self-attention (transformer) model, the fourth vector representation is determined based on the vector representation outputted by the L-layer transformer model, that is, the fourth vector representation of each entity node in the context is $h_i^l$, which is denoted by $$h_i^l = \text{EdgeCondigionedTransformer}(h_i^{l-1}), l=1,2,\ldots,L.$$

An association matrix among the entities is obtained, and a reachability of attention calculation from each entity node to other entity nodes is controlled based on the association matrix. Therefore, data of a sub-graph structure may be supported.

For example, at action 1: the number of model heads is set as the number R of relationship categories in the knowledge graph, and the vector representations Query(Q)/Kery(K)/Value(V) under each edge are obtained, in which, $$Q^l = H^l W_Q^l, K^l = H_i^l W_K^l, V^l = H^l W_V^l.$$

Where, l represents the current layer number, r represents a $r^{th}$ head, H represents a node vector inputted in the layer, and $W_Q^l$, $W_K^l$ and $W_V^l$ are weight parameters of a corresponding weight matrix under the $r^{th}$ head in the $l^{th}$ layer. The above weight parameters are obtained by learning in a model.

At action 2: attention values of each entity node with respect to other entity nodes are calculated. When the attention values are calculated, the reachability of the attention calculation of each entity node with respect to other entity nodes is controlled by using an association matrix $A^r$ between entity nodes under a specific relationship, that is, $$Z^r = \text{Attetion}^l\left(Q^r, K^r, K^r \middle| A^r\right) = \text{softmax}\left(\frac{Q^r\left[K^r\right]^T \circ (A^r)^T}{\sqrt{D_a}}\right) V^r.$$

$D_a$ represents a dimension parameter of an attention vector, for example, a common value is 64. $A^r$ represents an association matrix between entity nodes in the sub-graph under a relationship r, in which, a value of each element is 0 or 1. $A_{ij}^r=1$ represents that the $i^{th}$ entity node may be connected with the $j^{th}$ entity node through the relationship r in the sub-graph, that is, a triplet (entity node i, the relationship r, the entity node j) is established; Otherwise, $A_{ij}^r=0$.

At block 903, entity classification prediction is performed based on the fourth vector representation, processing parameters of the preset model are adjusted based on a prediction result, and the sub-graph context model is trained.

In this embodiment, after the fourth vector representation of the entity node is obtained, the fourth vector representation is processed based on a forward neural network (FFNN) and a softmax function, and a probability distribution $P(o)$ =softmax(FFNN($h_i^L$)) of each prediction result is obtained, thus the processing parameters of the model are optimized by maximizing the probability value of an actual result corresponding to the entity node.

For example, the entity node is "English", and the obtained prediction results include English, French, Japanese, etc. A probability of "English" in the prediction results is maximized by adjusting the model parameters, thus the sub-graph structure context model is trained.

Figure 10:
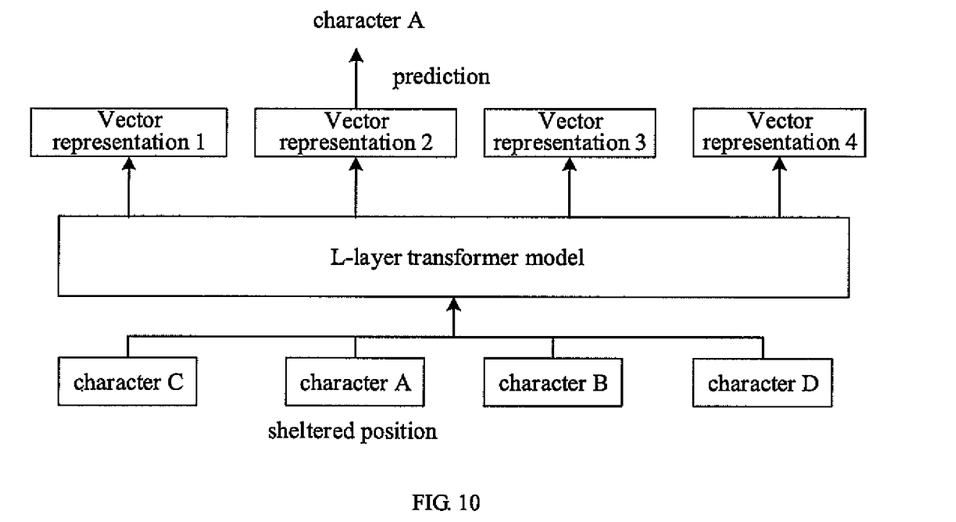
FIG. 10 is a schematic diagram illustrating a sub-graph context model.

For example, referring to FIG. 10, the knowledge graph illustrated in FIG. 6 is taken as an example. The entity nodes "character A", "character B", "character C" and "character D" are taken as the input of the preset model, and an sheltered position is determined as the position where the entity node "character A" is located. The fourth vector representation of the sheltered position output is obtained after a processing of the L-layer transformer model. The probability distribution of each prediction result is obtained based on the fourth vector representation, Further, the sheltered position is set as the position where the entity node "character B" is located for training.

In this embodiment of the present disclosure, the sub-graph context model may be trained, such that the input of the sub-graph context model is the context data, the output of the sub-graph context model is the vector representation corresponding to the entity node, and data of the sub-graph structure may be supported.

It should be noted that the sequence structure context model and the sub-graph context model above may share a table corresponding to the table lookup operation. Therefore, different context data may have a common impact on entity representation learning, such that the entity may fully learn various context data.

In order to implement the above embodiments, the present disclosure also provides an apparatus for generating a vector representation of the knowledge graph.

Figure 11:
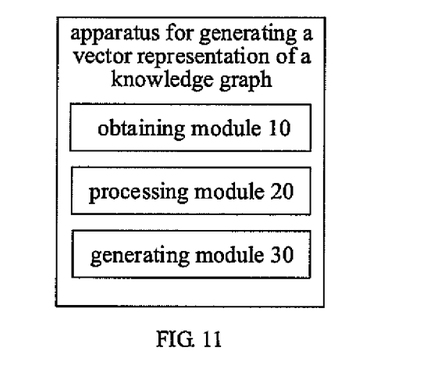
FIG. 11 is a block diagram illustrating an apparatus for generating a vector representation of a knowledge graph according to an embodiment of the present disclosure.

FIG. 11 is a block diagram illustrating an apparatus for generating a vector representation of a knowledge graph according to an embodiment of the present disclosure. As illustrated in FIG. 11, the apparatus includes: an obtaining module 10, a processing module 20 and a generating module 30.

The obtaining module 10 is configured to obtain a knowledge graph. The knowledge graph includes a plurality of entity nodes.

The processing module 20 is configured to obtain a context type and context data corresponding to the knowledge graph.

The generating module 30 is configured to generate vector representations corresponding to the plurality of entity nodes by a context model based on the context data and the context type.

Alternatively, the processing module 20 is configured to: obtain a number of the plurality of entity nodes in the knowledge graph; determine that the context type corresponding to the knowledge graph is a sequence structure context type in a case that the knowledge graph includes two entity nodes, and determine that the context type corresponding to the knowledge graph is a sub-graph context type in a case that the knowledge graph includes more than two entity nodes.

Alternatively, in response to determining that the context type corresponding to the knowledge graph is the sub-graph context type, the processing module 20 is configured to: S1, generate an entity node collection corresponding to the knowledge graph; S2, extract a first initial entity node from the entity node collection, and generate a walking radius d; S3, take the first initial entity node as a center, determine a d-order sub-graph centered on the first initial entity node by performing walking on the knowledge graph with the walking radius d, and add the d-order sub-graph centered on the first initial entity node to the context data; and S4, repeatedly execute the S2 and S3 until extraction for the entity nodes in the entity node collection is finished.

Alternatively, the context type corresponding to the knowledge graph is an edge structure context type, the processing module 20 is configured to add a triplet corresponding to the knowledge graph into the context data.

Alternatively, the context type corresponding to the knowledge graph is a path structure context type, the processing module 20 is configured to: obtain a path corresponding to the knowledge graph; obtain path data of the path in a path sampling mode, and add the path data and the entity nodes in the knowledge graph into the context data.

Alternatively, the context model includes a sequence structure context model and a sub-graph context model, and the generating module 30 is configured to: call the sequence structure context model to generate the vector representations corresponding to the plurality of entity nodes based on the context data in a case that the context type is the sequence structure context type; and call the sub-graph context model to generate the vector representations corresponding to the plurality of entity nodes based on the context data in a case that the context type is the sub-graph context type.

Figure 12:
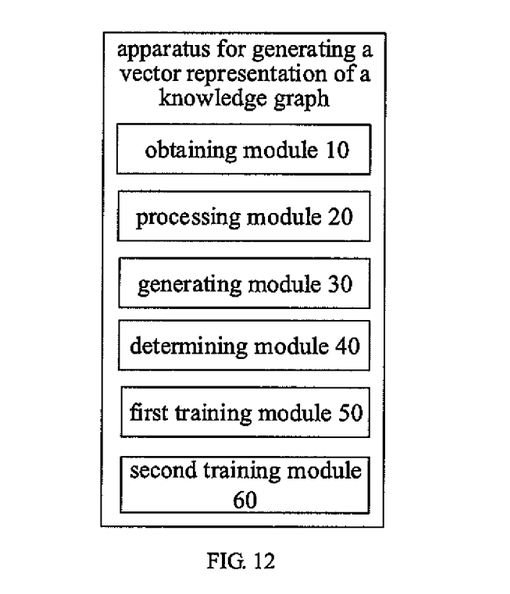
FIG. 12 is a block diagram illustrating an apparatus for generating a vector representation of a knowledge graph according to another embodiment of the present disclosure.

On a basis of FIG. 11, an apparatus illustrated in FIG. 12 also includes: a determining module 40, a first training module 50, and a second training module 60.

The determining module 40 is configured to obtain a number of edges between the two entity nodes in response to determining that the context type corresponding to the knowledge graph is the sequence structure context type, to determine that the context type corresponding to the knowledge graph is an edge structure context type in a case that the number of edges between the two entity nodes is equal to 1; and to determine that the context type corresponding to the knowledge graph is a path structure context type in a case that the number of edges between the two entity nodes is greater than 1.

The first training module 50 is configured to: obtain a sample knowledge graph, the sample knowledge graph including entity nodes and edges; by a table lookup operation, obtain a first vector representations of the entity nodes and the edges in the sample knowledge graph, and obtain a second vector representations of position information of the entity nodes and the edges in the sample knowledge graph; input the first vector representations and the second vector representations into a preset model for processing, and obtain a third vector representation corresponding to each entity node in the sample knowledge graph; and perform entity classification prediction based on the third vector representation, adjust processing parameters of the preset model based on a prediction result, and train the sequence structure context model.

The second training module 60 is configured to: obtain a sample knowledge graph, the sample knowledge graph including entity nodes and edges; obtain node vectors of the entity nodes in the sample knowledge graph by a table lookup operation, input the node vectors into a preset model for processing, and obtain a fourth vector representation corresponding to each entity node in the sample knowledge graph, in which an association matrix is obtained, and a reachability of attention calculation from each entity node to other entity nodes is controlled based on the association matrix; and perform entity classification prediction based on the fourth vector representation, to adjust processing parameters of the preset model based on a prediction result, and to train the sub-graph context model.

It should be noted that the description for the method for generating the vector representation of the knowledge graph in the above embodiments is also applicable to the apparatus for generating the vector representation of the knowledge graph in this embodiment, which is not elaborated here.

With the apparatus for generating the vector representation of the knowledge graph according to embodiments of the present disclosure, by obtaining the knowledge graph, the context type and the context data corresponding to the knowledge graph are obtained. Further, the vector representations corresponding to the plurality of entity nodes are generated by the context model based on the context data and the context type. In this way, the context where the entity is located is considered when the vector representation of the entity is generated. When the context where the entity is located varies, the vector representations obtained of the entity are different, which improves a modeling ability of the vector representation for a complex relationship, makes the representation ability more sufficient, and realizes a refined semantic representation of the entity in the context, thereby further improving the accuracy of representation learning for the knowledge graph.

To achieve the above embodiments, the present disclosure also provides a computer program product. When instructions in the computer program product are executed by a processor, the method for generating the vector generation of the knowledge graph according to any of the above embodiments is implemented.

According to embodiments of the present disclosure, the present disclosure also provides an electronic device and a readable storage medium.

Figure 13:
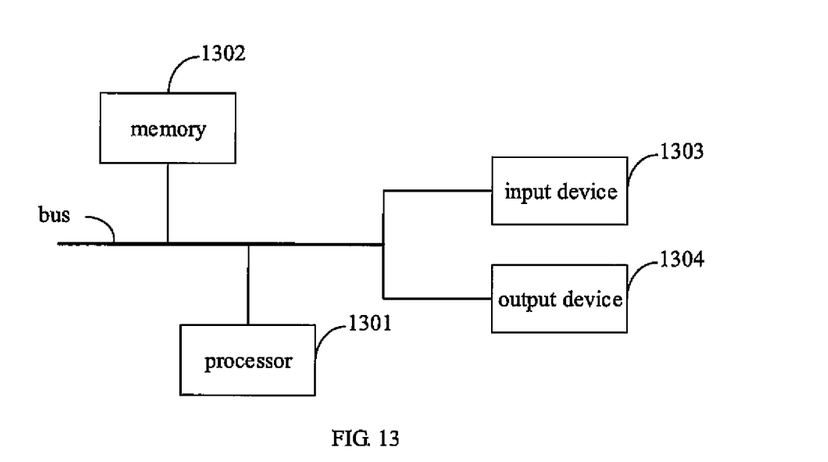
FIG. 13 is a block diagram illustrating an exemplary electronic device capable of implementing embodiments of the present disclosure.

As illustrated in FIG. 13, FIG. 13 is a block diagram illustrating an electronic device capable of implementing a method for generating a vector representation of a knowledge graph according to an embodiment of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, an intelligent phone, a wearable device and other similar computing device. The components illustrated herein, connections and relationships of the components, and functions of the components are merely examples, and are not intended to limit the implementation of the present disclosure described and/or claimed herein.

As illustrated in FIG. 13, the electronic device includes: one or more processors 1301, a memory 1302, and interfaces for connecting various components, including a high-speed interface and a low-speed interface. Various components are connected to each other by different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of electronic devices may be connected, and each device provides some necessary operations (for example, as a server array, a group of blade servers, or a multiprocessor system). In FIG. 13, one processor 1301 is taken as an example.

The memory 1302 is a non-transitory computer readable storage medium provided by the present disclosure. The memory is configured to store instructions executable by at least one processor, to enable the at least one processor to execute a method for generating a vector representation of a knowledge graph according to the present disclosure. The non-transitory computer readable storage medium according to the present disclosure is configured to store computer instructions. The computer instructions are configured to enable a computer to execute the method for generating the vector representation of the knowledge graph according to the present disclosure.

As the non-transitory computer readable storage medium, the memory 1302 may be configured to store non-transitory software programs, non-transitory computer executable programs and modules, such as program instructions/modules, for example, the obtaining module 10, the processing module 20, and the generating module 30 illustrated in FIG. 11, corresponding to the method for generating the vector representation of the knowledge graph according to embodiments of the present disclosure. The processor 1301 is configured to execute various functional applications and data processing of the server by operating non-transitory software programs, instructions and modules stored in the memory 1302, that is, implements the method for generating the vector representation of the knowledge graph according to the above method embodiment.

The memory 1302 may include a storage program region and a storage data region. The storage program region may store an application required by an operating system and at least one function. The storage data region may store data created according to usage of the electronic device. In addition, the memory 1302 may include a high-speed random access memory, and may also include a non-transitory memory, such as at least one disk memory device, a flash memory device, or other non-transitory solid-state memory device. In some embodiments, the memory 1302 may alternatively include memories remotely relative to the processor 1301, and these remote memories may be connected to the electronic device through a network. Examples of the above network include, but are not limited to, an Internet, an intranet, a local area network, a mobile communication network and combinations thereof.

The electronic device capable of implementing the method for generating the vector representation of the knowledge graph may also include: an input device 1303 and an output device 1304. The processor 1301, the memory 1302, the input device 1303, and the output device 1304 may be connected through a bus or in other means. In FIG. 13, the bus is taken as an example.

The input device 1303 may receive inputted digital or character information, and generate key signal input related to user setting and function control of the electronic device, such as a touch screen, a keypad, a mouse, a track pad, a touch pad, an indicator stick, one or more mouse buttons, a trackball, a joystick and other input device. The output device 1304 may include a display device, an auxiliary lighting device (e.g., LED), a haptic feedback device (such as, a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), computer hardware, firmware, software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal configured to provide the machine instructions and/or data to the programmable processor.

To provide interaction with the user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system (such as, a data server) including a background component, a computing system (such as, an application server) including a middleware component, or a computing system including a front-end component (such as, a user computer having a graphical user interface or a web browser, through which the user may interact with implements of the system and technologies described herein), or a computing system including any combination of the background component, the middleware component, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact through the communication network. A relationship between the client and the server is generated by computer programs operated on a corresponding computer and having a client-server relationship with each other.

With the technical solution according to embodiments of the present disclosure, the problem that the accuracy of generating the vector representation of the knowledge graph in a dense scene needs to be improved is solved, thereby improving the accuracy of generating the vector representation of the knowledge graph.

It should be understood that, steps may be reordered, added or deleted by utilizing flows in the various forms illustrated above. For example, the steps described in the present disclosure may be executed in parallel, sequentially or in a different order, so long as desired results of the technical solution disclosed in the present disclosure may be achieved, there is no limitation here.

The above detailed embodiments do not limit the protection scope of the present disclosure. It should be understood by the skilled in the art that various modifications, combinations, sub-combinations and substitutions may be made based on design requirements and other factors. Any modification, equivalent substitution and improvement made within the spirit and principle of the present disclosure shall be included in the protection scope of present disclosure.

What is claimed is:

1. A method for generating a vector representation of a knowledge graph, comprising:
   obtaining a knowledge graph, the knowledge graph comprising a plurality of entity nodes;
   obtaining a context type and context data corresponding to the knowledge graph; and
   generating vector representations corresponding to the plurality of entity nodes by a context model based on the context data and the context type;
   wherein obtaining the context type corresponding to the knowledge graph comprises:
   obtaining a number of the plurality of entity nodes in the knowledge graph;
   determining that the context type corresponding to the knowledge graph is a sequence structure context type in response to determining that the knowledge graph comprises two entity nodes, and
   determining that the context type corresponding to the knowledge graph is a sub-graph context type in response to determining that the knowledge graph comprises more than two entity nodes;

wherein the context model comprises a sequence structure context model and a sub-graph context model, and generating the vector representations corresponding to the plurality of entity nodes by the context model based on the context data and the context type comprises:

calling the sequence structure context model to generate the vector representations corresponding to the plurality of entity nodes based on the context data in response to determining that the context type is the sequence structure context type; and calling the sub-graph context model to generate the vector representations corresponding to the plurality of entity nodes based on the context data in response to determining that the context type is the sub-graph context type.

2. The method of claim 1, wherein, in response to determining that the context type corresponding to the knowledge graph is the sequence structure context type, the method further comprises:

obtaining a number of edges between the two entity nodes;

determining that the context type corresponding to the knowledge graph is an edge structure context type in response to determining that the number of the edges between the two entity nodes is equal to 1; and determining that the context type corresponding to the knowledge graph is a path structure context type in response to determining that the number of the edges between the two entity nodes is greater than 1.

3. The method of claim 2, wherein, in response to determining that the context type corresponding to the knowledge graph is the edge structure context type, obtaining the context data corresponding to the knowledge graph comprises:

adding a triplet corresponding to the knowledge graph into the context data.

4. The method of claim 2, wherein, in response to determining that the context type corresponding to the knowledge graph is the path structure context type, obtaining the context data corresponding to the knowledge graph comprises:

obtaining a path corresponding to the knowledge graph; and obtaining path data of the path in a path sampling mode, and adding the path data and the entity nodes in the knowledge graph into the context data.

5. The method of claim 1, wherein, in response to determining that the context type corresponding to the knowledge graph is the sub-graph context type, obtaining the context data corresponding to the knowledge graph comprises:

S1, generating an entity node collection corresponding to the knowledge graph;

S2, extracting a first initial entity node from the entity node collection, and generating a walking radius d;

S3, taking the first initial entity node as a center, determining a d-order sub-graph centered on the first initial entity node by performing walking on the knowledge graph with the walking radius d, and adding the d-order sub-graph centered on the first initial entity node to the context data; and S4, repeatedly executing the S2 and S3 until extraction for the entity nodes in the entity node collection is finished.

6. The method of claim 1, wherein the sequence structure context model is trained and obtained by:

obtaining a sample knowledge graph, the sample knowledge graph comprising entity nodes and edges;

by a table lookup operation, obtaining first vector representations of the entity nodes and the edges in the sample knowledge graph, and obtaining second vector representations of position information of the entity nodes and the edges in the sample knowledge graph;

inputting the first vector representations and the second vector representations into a preset model for processing, and obtaining a third vector representation corresponding to each entity node in the sample knowledge graph; and performing entity classification prediction based on the third vector representation, adjusting processing parameters of the preset model based on a prediction result, and training the sequence structure context model.

7. The method of claim 1, wherein the sub-graph context model is trained by:

obtaining a sample knowledge graph, the sample knowledge graph comprising entity nodes and edges;

obtaining node vectors of the entity nodes in the sample knowledge graph by a table lookup operation, inputting the node vectors into a preset model for processing, and obtaining a fourth vector representation corresponding to each entity node in the sample knowledge graph, wherein an association matrix is obtained, and a reachability of attention calculation from each entity node to other entity nodes is controlled based on the association matrix; and performing entity classification prediction based on the fourth vector representation, adjusting processing parameters of the preset model based on a prediction result, and training the sub-graph context model.

8. An apparatus for generating a vector representation of a knowledge graph, comprising:

a processor; and a memory, configured to store one or more software modules, wherein the processor is configured to run a program corresponding to a consensus mechanism deployment method by reading the software modules, the one or more software modules comprising:

an obtaining module, configured to obtain a knowledge graph, the knowledge graph comprising a plurality of entity nodes;

a processing module, configured to obtain a context type and context data corresponding to the knowledge graph; and a generating module, configured to generate vector representations corresponding to the plurality of entity nodes by a context model based on the context data and the context type;

wherein the processing module is configured to:

obtain a number of the plurality of entity nodes in the knowledge graph;

determine that the context type corresponding to the knowledge graph is a sequence structure context type in response to determining that the knowledge graph comprises two entity nodes, and determine that the context type corresponding to the knowledge graph is a sub-graph context type in response to determining that the knowledge graph comprises more than two entity nodes;

wherein the context model comprises a sequence structure context model and a sub-graph context model, and the generating module is configured to:

call the sequence structure context model to generate the vector representations corresponding to the plurality of entity nodes based on the context data in response to determining that the context type is the sequence structure context type; and call the sub-graph context model to generate the vector representations corresponding to the plurality of entity nodes based on the context data in response to determining that the context type is the sub-graph context type.

9. The apparatus of claim 8, wherein, the one or more software modules further comprises a determining module, configured to:

obtain a number of edges between the two entity nodes in response to determining that the context type corresponding to the knowledge graph is the sequence structure context type;

determine that the context type corresponding to the knowledge graph is an edge structure context type in response to determining that the number of edges between the two entity nodes is equal to 1; and determine that the context type corresponding to the knowledge graph is a path structure context type in response to determining the number of edges between the two entity nodes is greater than 1.

10. The apparatus of claim 9, wherein, in response to determining that the context type corresponding to the knowledge graph is the edge structure context type, the processing module is configured to:

add a triplet corresponding to the knowledge graph into the context data.

11. The apparatus of claim 9, wherein, in response to determining that the context type corresponding to the knowledge graph is the path structure context type, the processing module is configured to:

obtain a path corresponding to the knowledge graph;

obtain path data of the path in a path sampling mode, and add the path data and the entity nodes in the knowledge graph into the context data.

12. The apparatus of claim 8, wherein, in response to determining that the context type corresponding to the knowledge graph is the sub-graph context type, the processing module is configured to:

S1, generate an entity node collection corresponding to the knowledge graph;

S2, extract a first initial entity node from the entity node collection, and generate a walking radius d;

S3, take the first initial entity node as a center, determine a d-order sub-graph centered on the first initial entity node by performing walking on the knowledge graph with the walking radius d, and add the d-order sub-graph centered on the first initial entity node to the context data; and S4, repeatedly execute the S2 and S3 until extraction for the entity nodes in the entity node collection is finished.

13. The apparatus of claim 8, wherein, the one or more software modules further comprises a first training module, configured to:

obtain a sample knowledge graph, the sample knowledge graph comprising entity nodes and edges;

by a table lookup operation, obtain first vector representations of the entity nodes and the edges in the sample knowledge graph, and obtain second vector representations of position information of the entity nodes and the edges in the sample knowledge graph;

input the first vector representations and the second vector representations into a preset model for processing, and obtain a third vector representation corresponding to each entity node in the sample knowledge graph; and perform entity classification prediction based on the third vector representation, adjust processing parameters of the preset model based on a prediction result, and train the sequence structure context model.

14. The apparatus of claim 8, wherein, the one or more software modules further comprises a second training module, configured to:

obtain a sample knowledge graph, the sample knowledge graph comprising entity nodes and edges;

obtain node vectors of the entity nodes in the sample knowledge graph by a table lookup operation, input the node vectors into a preset model for processing, and obtain a fourth vector representation corresponding to each entity node in the sample knowledge graph, wherein an association matrix is obtained, and a reachability of attention calculation from each entity node to other entity nodes is controlled based on the association matrix; and perform entity classification prediction based on the fourth vector representation, adjust processing parameters of the preset model based on a prediction result, and train the sub-graph context model.

15. A non-transitory computer readable storage medium having computer instructions stored thereon, wherein the computer instructions are configured to cause a computer to execute a method for generating a vector representation of a knowledge graph, the method comprising:

obtaining a knowledge graph, the knowledge graph comprising a plurality of entity nodes;

obtaining a context type and context data corresponding to the knowledge graph; and generating vector representations corresponding to the plurality of entity nodes by a context model based on the context data and the context type;

wherein obtaining the context type corresponding to the knowledge graph comprises:

obtaining a number of the plurality of entity nodes in the knowledge graph;

determining that the context type corresponding to the knowledge graph is a sequence structure context type in response to determining that the knowledge graph comprises two entity nodes, and determining that the context type corresponding to the knowledge graph is a sub-graph context type in response to determining that the knowledge graph comprises more than two entity nodes;

wherein the context model comprises a sequence structure context model and a sub-graph context model, and generating the vector representations corresponding to the plurality of entity nodes by the context model based on the context data and the context type comprises:

calling the sequence structure context model to generate the vector representations corresponding to the plurality of entity nodes based on the context data in response to determining that the context type is the sequence structure context type; and calling the sub-graph context model to generate the vector representations corresponding to the plurality of entity nodes based on the context data in response to determining that the context type is the sub-graph context type.

* * * * *